United States Patent
Haruta

(10) Patent No.: US 11,919,216 B2
(45) Date of Patent: Mar. 5, 2024

(54) ROLL OF WHITE HEAT-SHRINKABLE POLYESTER-BASED FILM

(71) Applicant: TOYOBO CO., LTD., Osaka (JP)

(72) Inventor: Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 72 days.

(21) Appl. No.: 16/356,719

(22) Filed: Mar. 18, 2019

(65) Prior Publication Data

US 2019/0210262 A1 Jul. 11, 2019

Related U.S. Application Data

(63) Continuation of application No. PCT/JP2017/034681, filed on Sep. 26, 2017.

(30) Foreign Application Priority Data

Sep. 28, 2016 (JP) ................. 2016-190407

(51) Int. Cl.
 *B29C 48/08* (2019.01)
 *B29C 48/00* (2019.01)
 (Continued)

(52) U.S. Cl.
 CPC ............ *B29C 48/08* (2019.02); *B29C 48/022* (2019.02); *B29C 48/9135* (2019.02);
 (Continued)

(58) Field of Classification Search
 CPC ..... B29C 48/08; B29C 48/9135; B29C 55/04; B29K 2995/0049; B29K 2067/00; C08J 5/18; C08K 2003/2237; C08K 3/22
 See application file for complete search history.

(56) References Cited

U.S. PATENT DOCUMENTS

2002/0090502 A1 7/2002 Ito et al.
2002/0136875 A1\* 9/2002 Murschall ............... B32B 27/36
  428/212

(Continued)

FOREIGN PATENT DOCUMENTS

EP 3437834 A1 2/2019
JP H07-001572 A 1/1995
(Continued)

OTHER PUBLICATIONS

Japanese Patent Office, International Search Report in International Patent Application No. PCT/JP2017/034681 (dated Dec. 26, 2017).

(Continued)

*Primary Examiner* — Jenna N Chandhok
(74) *Attorney, Agent, or Firm* — Leydig, Voit & Mayer, Ltd.

(57) ABSTRACT

The invention provides a roll of a white heat-shrinkable polyester-based film containing titanium oxide which can suppress occurrence of a processing trouble of a label or the like cut out from the roll, even when widening the roll. The roll of the white heat-shrinkable polyester-based film satisfies the following requirements: (1) the length of the film is 1,000-20,000 m and the width of the film is 400-10,000 mm, (2) the heat-shrinkage ratio in a main shrinkage direction is 50-85%, (3,4) the difference between the maximum and minimum heat-shrinkage ratio in the main shrinkage direction is 0-3% among samples which are sampled in each of the width and longitudinal directions of the film, and (5,6) the difference between the maximum and minimum apparent specific gravity is 0-0.01 g/cm³ among samples which are sampled in each of the width and longitudinal directions of the film.

10 Claims, 3 Drawing Sheets

(51) Int. Cl.
    *B29C 48/88*     (2019.01)
    *B29C 55/04*     (2006.01)
    *B29C 55/30*     (2006.01)
    *B29C 61/06*     (2006.01)
    *B29K 67/00*     (2006.01)
    *C08G 63/181*     (2006.01)
    *C08G 63/199*     (2006.01)
    *C08J 5/18*     (2006.01)
    *C08K 3/22*     (2006.01)

(52) U.S. Cl.
    CPC .............. *B29C 55/04* (2013.01); *B29C 55/30* (2013.01); *B29C 61/06* (2013.01); *C08G 63/181* (2013.01); *C08G 63/199* (2013.01); *C08J 5/18* (2013.01); *C08K 3/22* (2013.01); *B29K 2067/00* (2013.01); *B29K 2995/0049* (2013.01); *C08K 2003/2237* (2013.01)

(56) References Cited

U.S. PATENT DOCUMENTS

| | | |
|---|---|---|
| 2003/0165658 A1 | 9/2003 | Hayakawa et al. |
| 2005/0236731 A1 | 10/2005 | Hayakawa et al. |
| 2008/0284057 A1 | 11/2008 | Hayakawa et al. |
| 2009/0042005 A1 | 2/2009 | Hashimoto et al. |
| 2011/0008607 A1 | 1/2011 | Haruta et al. |
| 2012/0100363 A1 | 4/2012 | Yamamoto et al. |
| 2013/0011587 A1 | 1/2013 | Kim et al. |
| 2015/0027530 A1 | 1/2015 | Kim et al. |
| 2017/0021601 A1 | 1/2017 | Haruta et al. |
| 2019/0337272 A1 | 11/2019 | Haruta et al. |

FOREIGN PATENT DOCUMENTS

| | | |
|---|---|---|
| JP | H08-244109 A | 9/1996 |
| JP | 2002-036356 A | 2/2002 |
| JP | 2004-299216 A | 10/2004 |
| JP | 2005-206730 A | 8/2005 |
| JP | 2006-328271 A | 12/2006 |
| JP | 2008-030366 A | 2/2008 |
| JP | 4232777 B2 | 3/2009 |
| JP | 2009-226934 A | 10/2009 |
| JP | 2015-199336 A | 11/2015 |
| JP | 2015-199337 A | 11/2015 |
| JP | 2015-199909 A | 11/2015 |
| KR | 10-2012-0036951 A | 4/2012 |
| TW | 200906598 A | 2/2009 |
| WO | WO 2014/046135 A1 | 3/2014 |

OTHER PUBLICATIONS

Japanese Patent Office, Notification for Reasons for Rejection in Japanese Patent Application No. 2018-542581 (dated Mar. 5, 2019).
European Patent Office, Extended European Search Report in European Patent Application No. 17856095.9 (dated Apr. 9, 2020).
Taiwan Intellectual Property Office, First Office Action in Taiwanese Patent Application No. 106133346 (dated Oct. 19, 2020).
European Patent Office, Communication Pursuant to Article 94(3) EPC in European Patent Application No. 17856095.9 (dated Nov. 11, 2021).
Korean Intellectual Property Office, Notification of Reason for Refusal in Korean Patent Application No. 10-2019-7007420 (dated Oct. 8, 2021).

\* cited by examiner

[Figure 1]
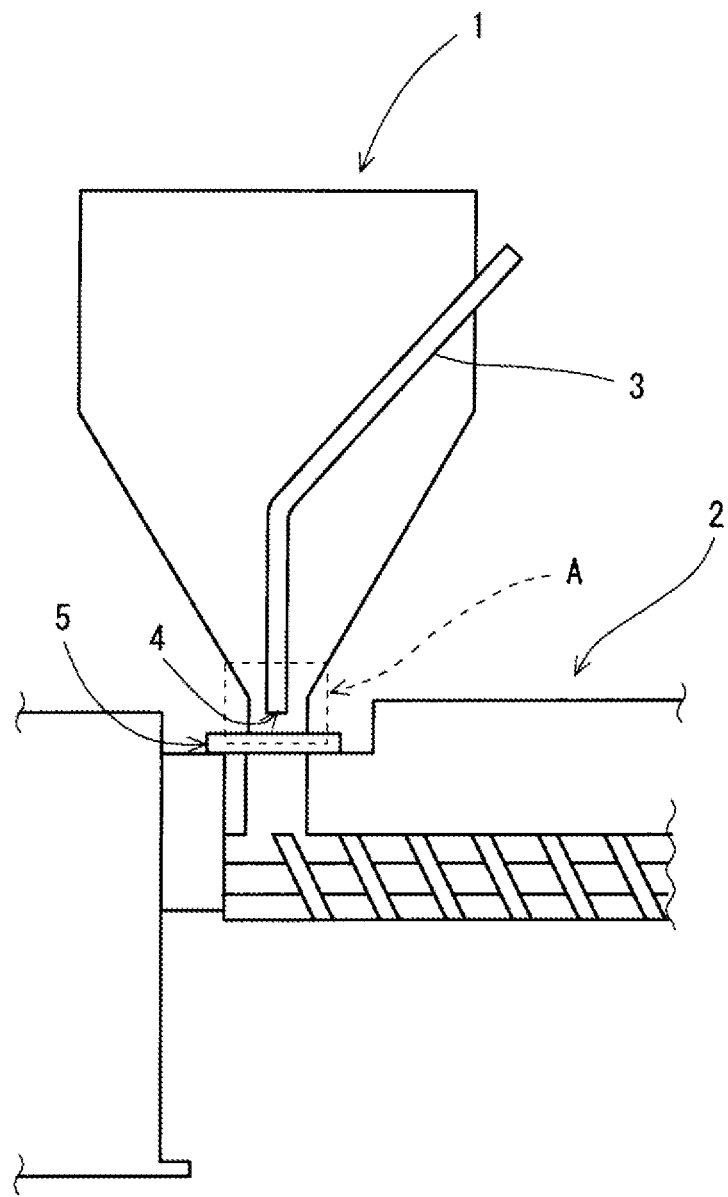

[Figure 2]
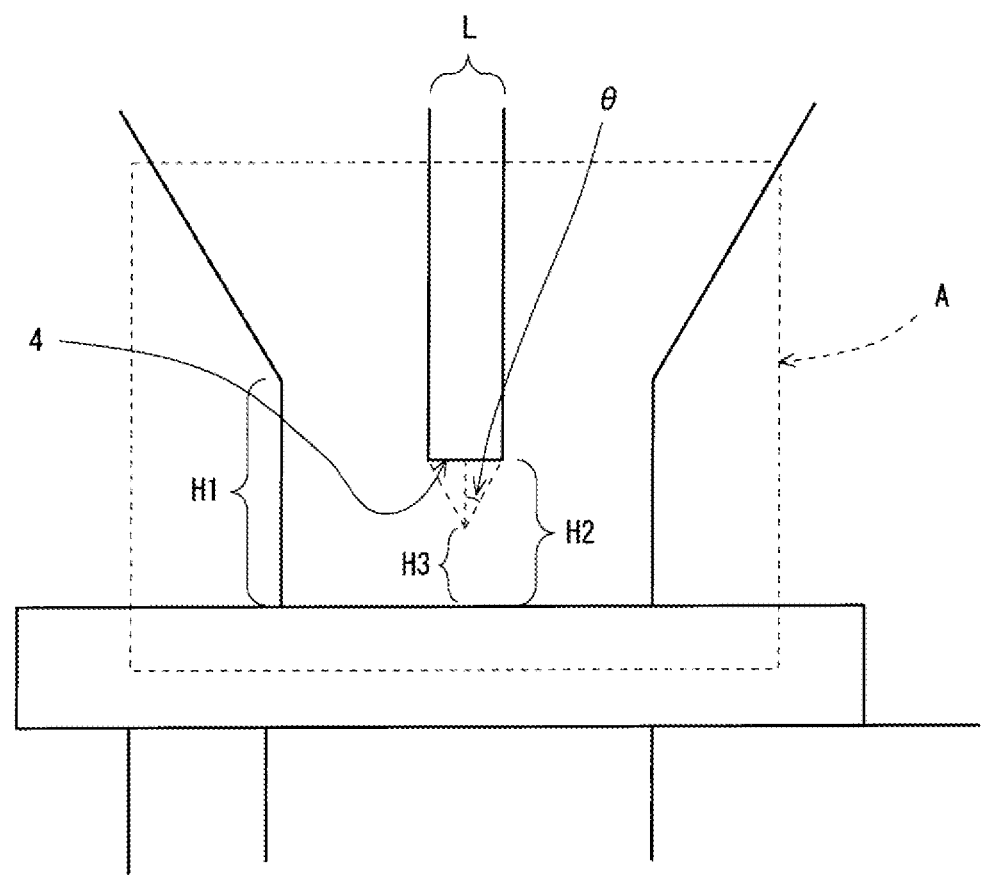

[Figure 3]
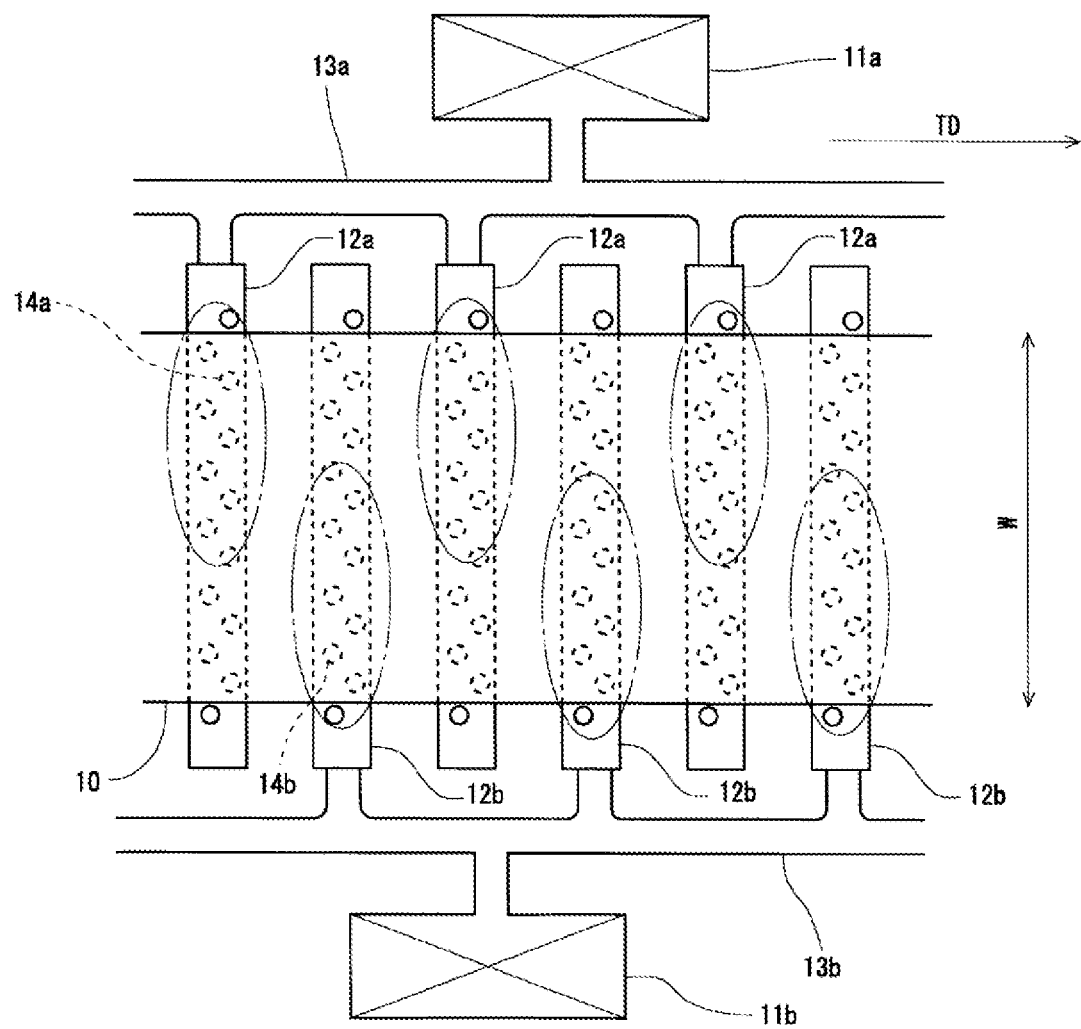

ROLL OF WHITE HEAT-SHRINKABLE POLYESTER-BASED FILM

CROSS-REFERENCE TO RELATED APPLICATIONS

This patent application is a continuation of copending International Patent Application No. PCT/JP2017/034681, filed Sep. 26, 2017, which claims the benefit of Japanese Patent Application No. 2016-190407, filed on Sep. 28, 2016, which are incorporated by reference in their entireties herein.

TECHNICAL FIELD

The present invention relates to a roll of a white heat-shrinkable polyester-based film, and particularly relates to a roll of a white heat-shrinkable polyester-based film suitable for label applications. More specifically, the present invention relates to a roll of a white heat-shrinkable polyester-based film capable of having a beautiful appearance with small variations in physical properties of labels or the like to be cut out even when the roll has a long and wide white heat-shrinkable polyester-based film.

BACKGROUND ART

Films made of polyvinyl chloride, polystyrene or the like are mainly used as a heat-shrinkable film, particularly a heat-shrinkable film for a label of bottle body part. However, polyvinyl chloride recently has a problem of chlorine gas generation at incineration disposal, and polystyrene has problems such as difficulty in printing and the like. Thus, a polyester-based heat-shrinkable film having less above problems has been attracting attention. However, since a general heat-shrinkable polyester-based film is transparent, it has high light transmittance, which is not suitable for protection of contents. Therefore, there is a great demand for a white heat-shrinkable polyester-based film with reduced light transmittance formed by mixing titanium oxide. Thus, a white heat-shrinkable polyester-based film has been studied. A method of mixing titanium oxide into a main raw material of a heat-shrinkable polyester-based film (Patent Document 1) has been proposed.

PRIOR ART DOCUMENT

Patent Document

Patent Document 1: JP 2002-36356 (A)
Patent Document 2: JP 4232777 (B2)

SUMMARY OF THE INVENTION

Problems to be Solved by the Invention

Patent Document 1 describes production of a void-containing heat-shrinkable polyester-based film by mixing a thermoplastic resin incompatible with polyester and a main raw material, and also describes that it is possible to increase foaming (voids) by increasing the ratio of the thermoplastic resin incompatible with polyester to make the apparent specific gravity less than 1.00. Patent Document 1 describes also that the film has no problem in printing by making an unfoamed layer on the outside. Patent Document 2 describes a transparent heat-shrinkable polyester film roll which is produced by a method capable of reducing variation of physical property in a film longitudinal direction. The method described in Patent Document 2 is, for example, (i) making a chip shape uniform, (ii) optimizing shape and capacity of a hopper, and (iii) reducing fine powder.

Recently, increased production has been generally carried out for cost reduction and efficiency improvement. In uniaxial stretching in a width direction, which is a general method for producing a heat-shrinkable polyester-based film, widening and acceleration are performed because of increase of the speed. However, due to the widening, physical property differences in a film width direction (so-called bowing phenomenon) become large, causing variations in shrinkage ratio and other physical properties. Therefore, a wide product roll having uniform physical properties in a width direction cannot be obtained, which causes troubles in processing.

A white heat-shrinkable polyester film containing titanium oxide is generally formed by mixing resin chips containing titanium oxide and having the high specific gravity with resin chips having the normal specific gravity. However, since the difference in specific gravity between the resin chips containing titanium oxide and the normal resin chips is large, the raw material ratio tends to vary in the mixing and extrusion process of these raw material resin chips, so that the film has variation in physical property in the film longitudinal direction and the film width direction. As a result, a wide product roll having uniform physical properties in the width direction and a product roll made of long film having uniform physical properties in the longitudinal direction cannot be obtained, which causes troubles in processing.

Patent Document 1 does not describe a method of reducing variations in physical properties in the width and longitudinal direction. Patent Document 2 does not describe a white heat-shrinkable polyester-based film, and the difference between the maximum and minimum shrinkage ratio is as large as 6%. Moreover, stabilization of physical properties in the case of using resin chips having a large specific gravity such as chips containing titanium oxide and stabilization of physical properties in producing a wide polyester film are not also taken into consideration sufficiently.

An object of the present invention is to provide a roll of a white heat-shrinkable polyester-based film containing titanium oxide which can suppress occurrence of a processing trouble of a label or the like cut out from the roll, even when widening the white heat-shrinkable polyester-based film roll.

Solutions of the Problems

As a result of intensive studies for achieving the above object, the inventors have found the present invention. Specifically, the present invention as follows.

[1] A roll of a white heat-shrinkable polyester-based film comprising at least one layer of a white polyester-based resin layer containing titanium oxide and satisfying the following requirements (1) to (6):
  (1) the length of the film is 1000 m or more and 20000 m or less and the width of the film is 400 mm or more and 10000 mm or less;
  (2) the heat-shrinkage ratio in a main shrinkage direction is 50% or more and 85% or less, wherein the heat-shrinkage ratio is measured according to a hot water treatment of a treatment temperature of 98° C. and a treatment time of 10 seconds;
  (3) the difference between the maximum and minimum heat-shrinkage ratio in the main shrinkage direction among samples is 0% or more and 3% or less, wherein the heat-shrinkage ratio is measured according to the hot water treatment of a treatment temperature of 98° C. and a treatment time of 10 seconds and the samples are taken from each part of the film divided into five in the film width direction;

(4) the difference between the maximum and minimum heat-shrinkage ratio in the main shrinkage direction among samples is 0% or more and 3% or less, wherein the heat-shrinkage ratio is measured according to the hot water treatment of a treatment temperature of 98° C. and a treatment time of 10 seconds and the samples are taken from the film every 100 m in the film longitudinal direction from the place forming surface layer of the roll of the white heat-shrinkable polyester-based film to the starting place of winding the film;

(5) the difference between the maximum and minimum apparent specific gravity among samples is 0 g/cm$^3$ or more and 0.01 g/cm$^3$ or less, wherein the samples are taken from each part of the film divided into five in the film width direction; and (6) the difference between the maximum and minimum apparent specific gravity among samples is 0 g/cm$^3$ or more and 0.010 g/cm$^3$ or less, wherein the samples are taken from the film every 100 m in the film longitudinal direction from the place forming surface layer of the roll of the white heat-shrinkable polyester-based film to the starting place of winding the film.

[2] The roll of the white heat-shrinkable polyester-based film according to [1], wherein the total light transmittance of the film is 40% or less;

the difference between the maximum and minimum total light transmittance among samples is 3% or less, wherein the samples are taken from each part of the film divided into five in the film width direction; and the difference between the maximum and minimum total light transmittance among samples is 3% or less, wherein the samples are taken from the film every 100 m in the film longitudinal direction from the place forming surface layer of the roll of the white heat-shrinkable polyester-based film to the starting place of winding the film.

[3] The roll of the white heat-shrinkable polyester-based film according to [1] or [2], wherein the gloss of the film is 40% or more and 150% or less on both sides of the film, wherein the gloss is measured at 60 degrees angle;

the difference between the maximum and minimum gloss among samples is 5% or less on both sides of the film, wherein the samples are taken from each part of the film divided into five in the film width direction; and the difference between the maximum and minimum gloss among samples is 5% or less on both sides of the film, wherein the samples are taken from the film every 100 m in the film longitudinal direction from the place forming surface layer of the roll of the white heat-shrinkable polyester-based film to the starting place of winding the film.

[4] The roll of the white heat-shrinkable polyester-based film according to any one of [1] to [3], wherein the heat shrinkage stress in the main shrinkage direction of the film is 9 MPa or less, wherein the heat shrinkage stress are measured according to a hot air treatment of a treatment temperature of 90° C.;

the difference between the maximum and minimum heat shrinkage stress in the main shrinkage direction among samples is 1 MPa or less, wherein the heat shrinkage stress is measured according to the hot air treatment of a treatment temperature of 90° C. and the samples are taken from each part of the film divided into five in the film width direction; and the difference between the maximum and minimum heat shrinkage stress in the main shrinkage direction among samples is 1 MPa or less, wherein the heat shrinkage stress is measured according to the hot air treatment of a treatment temperature of 90° C. and the samples are taken from the film every 100 m in the film longitudinal direction from the place forming surface layer of the roll of the white heat-shrinkable polyester-based film to the starting place of winding the film.

[5] The roll of the white heat-shrinkable polyester-based film according to any one of [1] to [4], wherein the solvent adhesive strength of the film is 2 N/15 mm width or more and 10 N/15 mm width or less.

[6] The roll of the white heat-shrinkable polyester-based film according to any one of [1] to [5], wherein the roll of the white heat-shrinkable polyester-based film has an amorphous unit derived from at least one selected from the group consisting of isophthalic acid, neopentyl glycol and cyclohexane dimethanol;

the difference between the maximum and minimum content of the amorphous unit among samples is 2 mol % by mass or less, wherein the samples are taken from each part of the film divided into five in the film width direction; and the difference between the maximum and minimum content of the amorphous unit among samples is 2.0 mol % by mass or less, wherein the samples are taken from the film every 100 m in the film longitudinal direction from the place forming surface layer of the roll of the white heat-shrinkable polyester-based film to the starting place of winding the film.

[7] A heat-shrinkable label obtained from the roll of the white heat-shrinkable polyester-based film according to any one of [1] to [6].

[8] A package comprising the heat-shrinkable label according to [7], wherein the heat-shrinkable label covers at least a part of a periphery of an object to be wrapped.

[9] A method for producing a roll of a white heat-shrinkable polyester-based film comprising:

supplying a white polyester-based resin chip containing titanium oxide and another raw material resin chip to an extruder with a hopper and mixing them, melting and extruding a mixture of the white polyester-based resin chip and the raw material resin chip followed by roll-cooling to make a extruded film, heating and stretching the extruded film in a width direction, wherein the raw material resin chip is supplied to the hopper from above, and the white polyester-based resin chip is supplied to the extruder through a pipe whose outlet is located in the hopper and right and immediately above the inlet of the extruder;

the roll-cooling is performed by contacting the extruded film with a roll and sullying cold air to a roll non-contact surface of the film;

the heating the extruded film is performed by using hot air supply nozzles (a) from one heat source and hot air supply nozzles (b) from another heat source, the air supply nozzles (a) and the air supply nozzles (b) are arranged alternately along flow direction of the film, the heat source connecting to the air supply nozzles (a) is disposed on one side in the width direction of the extruded film, and the heat source connecting to the air supply nozzles (b) is disposed on the other side; and the length of the white heat-shrinkable polyester-based film is 1000 m or more and 20000 m or less and the width of the white heat-shrinkable polyester-based film is 400 mm or more and 10000 mm or less.

Effect of the Invention

The roll of the white heat-shrinkable polyester-based film of the present invention has high shrinkability in a main shrinkage direction and good shrinkage finish property when a label is obtained from the roll. In addition, despite containing titanium oxide and having a wide width, the roll of the white heat-shrinkable polyester-based film of the present invention has small variations in physical properties in both the width and longitudinal direction of the film forming the roll. As a result, the roll of the white heat-shrinkable polyester-based film makes it possible to stabilize quality of a label or the like cut out from the roll and to reduce troubles during processing of the label or the like.

BRIEF DESCRIPTION OF THE DRAWINGS

FIG. 1 is a schematic view for explaining an example of a method of mixing resin chips for producing the roll of the white heat-shrinkable polyester-based film of the present invention.

FIG. 2 is a partial enlarged view of FIG. 1.

FIG. 3 is a schematic view for explaining an example of a heating method of the film for producing the roll of the white heat-shrinkable polyester-based film of the present invention.

MODE FOR CARRYING OUT THE INVENTION

A white heat-shrinkable polyester-based film forming a film roll of the present invention has at least one layer of a white polyester-based resin layer containing titanium oxide, and heat shrinkability is imparted by stretching an extruded film. A polyester-based film used in such a heat-shrinkable film may be a film obtained by extruding a copolymerized polyester alone, or a film obtained by mixing and extruding a plurality of polyesters (copolyester, homopolyester, etc.). In either case, the polyester-based film has the heat shrinkability by being composed of a crystalline unit and an amorphous component. Specifically, the polyester-based film contains a base unit and a second dicarboxylic acid component and/or a second polyol component. The base unit is the crystalline unit, and examples the base unit include polyethylene terephthalate. The second dicarboxylic acid component is different from a dicarboxylic acid component constituting the base unit (such as a terephthalic acid component), and imparts amorphousness to the film. The second polyol component is different from a polyhydric glycol component constituting the base unit (such as an ethylene glycol component), and imparts amorphousness to the film. When two or more kinds of polyesters are used to mix, the polyesters before mixed are not limited as long as a polyester after transesterification contains the base unit and the second dicarboxylic acid component and/or the second polyol component. A content of the base unit (for example, ethylene terephthalate unit) is preferably 50 mol % or more, and more preferably 60 mol % or more, in 100 mol % of the unit constituting the polyester.

Examples of the second dicarboxylic acid component include an aromatic dicarboxylic acid such as isophthalic acid, orthophthalic acid and 2,6-naphthalene dicarboxylic acid; an aliphatic dicarboxylic acid such as adipic acid, azelaic acid, sebacic acid and decanedicarboxylic acid; and a cycloaliphatic dicarboxylic acid such as 1,4-cyclohexanedicarboxylic acid.

A trivalent or higher polycarboxylic acid (for example, trimellitic acid, pyromellitic acid and an anhydride thereof) may be contained in the polyester, and is preferably not contained. A heat-shrinkable polyester-based film obtained by using the polyester containing the trivalent or higher polycarboxylic acid is difficult to achieve a necessary high shrinkage ratio.

Examples of a diol component among the second polyol component include an aliphatic diol such as 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, 3-methyl-1,5-pentanediol, 2-methyl-1,5-pentanediol, 1,4-butanediol, 1,6-hexanediol, 1,9-nonanediol, 1,10-decanediol and neopentyl glycol; an alicyclic diol such as 1,4-cyclohexanedimethanol; an ether glycol such as diethylene glycol, triethylene glycol, polypropylene glycol, polyoxytetramethylene glycol, and an alkylene oxide adduct of a bisphenol compound or a derivative thereof; a dimer diol; and an aromatic diol such as bisphenol A.

Examples of a trivalent or higher polyol component include trimethylolpropane, glycerin, and pentaerythritol.

The ratio of the amorphous component is preferably 14 mol % or more, more preferably 16 mol % or more, and particularly preferably 18 mol % or more, wherein the ratio of the amorphous component is total of the ratio of the dicarboxylic acid component other than terephthalic acid in 100 mol % of a carboxylic acid component and the ratio of the polyol component other than ethylene glycol component in 100 mol % of a polyol component.

In order to particularly improve shrinkage finish property while maintaining the high heat-shrinkage ratio, the total of the ratio of isophthalic acid component in 100 mol % of the carboxylic acid component, and the ratio of neopentyl glycol and 1,4-cyclohexanedimethanol component in 100 mol % of the polyol component in the whole polyester resin is preferably 14 mol % or more, more preferably 16 mol % or more, and particularly preferably 18 mol % or more. The upper limit of the ratio is not particularly limited. However, when the ratio is too large, the heat-shrinkage ratio may increase excessively and the resistance to breakage of the film may be deteriorated, so that it is preferably 40 mol % or less, more preferably 35 mol % or less, and particularly preferably 30 mol % or less.

The white heat-shrinkable polyester-based film may have a multilayer structure. In that case, it is preferable that at least one layer satisfies the above ratio of the ethylene terephthalate unit and the above ratio of the amorphous component, and more preferable that a thickest layer satisfy. Further, it is also preferable that the average composition of the entire film satisfies the ratio of the ethylene terephthalate unit and the ratio of the amorphous component.

In order to improve the shrinkage finish property, a polyester-based elastomer may be contained. The content of the polyester-based elastomer is, for example, 3% by mass or more in the whole polyester. The polyester-based elastomer herein refers to, for example, a polyester-based block copolymer composed of a crystalline polyester segment with high melting point (Tm of 200° C. or higher) and a soft polymer segment with low melting point (Tm of 80° C. or lower) having a molecular weight of 400 or more (preferably 400 to 800). Examples of the polyester-based elastomer include a polyester-based elastomer using a polylactone such as poly-ε-caprolactone as the soft polymer segment with low melting point.

An aliphatic straight chain diol having 8 or more carbon atoms and a trihydric or higher polyhydric alcohol are preferably not contained. Examples of the aliphatic straight chain diol include octane diol, and examples of the trihydric or higher polyhydric alcohol include trimethylol propane, trimethylol ethane, glycerin and diglycerin. A heat-shrinkable polyester-based film obtained by using a polyester containing the diol or the polyhydric alcohol is hard to have a necessary shrinkage ratio in the main shrinkage direction.

Also, it is preferable that diethylene glycol, triethylene glycol, and polyethylene glycol are not contained as much as possible. Particularly, diethylene glycol is a by-product component during polyester polymerization, and easily presents. However, the content of diethylene glycol in the polyester used in the present invention is preferably less than 4 mol %.

The white heat-shrinkable polyester-based film contains titanium oxide (particles). Containing titanium oxide (particularly titanium dioxide) lowers the total light transmittance and whitens the film. Titanium dioxide is classified into anatase type crystal form and rutile type crystal form, and both of which are used for kneading in plastics. The anatase type titanium oxide tends to cause yellowing and degradation of the resin due to direct sunlight or the like. Thus, when the anatase type titanium oxide is used outdoors, special treatment (such as alumina treatment, silica treatment, and organic treatment) is applied to the surface of the titanium oxide, or the rutile type titanium oxide is selected in many cases. The content of the titanium oxide in the white heat-shrinkable polyester-based film is, for example, 0.1% by mass or more, preferably 1% by mass or more, and more preferably 3% by mass or more. From the viewpoint of securing film strength and facilitating film formation, the content of the titanium oxide is, for example, 25% by mass or less, preferably 20% by mass or less, and more preferably 15% by mass or less. When the film has a multilayer structure, at least one layer is required to be a white polyester-based resin layer containing the titanium oxide, and the content of the titanium oxide in the layer containing the titanium oxide is preferably in the above range.

The white heat-shrinkable polyester-based film may contain a particle other than the titanium oxide such as an organic particle and an inorganic particle. The particle also contribute to reduction of the total light transmittance of the film. Examples of the inorganic particle include a known inert particle such as kaolin, clay, calcium carbonate, silicon oxide, calcium terephthalate, aluminum oxide, calcium phosphate, and carbon black; an organic compound with high melting point which is insoluble during the melting a polyester-based resin to obtain the film; a crosslinked polymer; and a catalyst of a metal compound used in polyester synthesis such as an alkali metal compound and an alkaline earth metal compound.

The particle of titanium oxide or the like may be fine powder having micron size or less, and its average primary particle size is, for example, in the range of 0.001 to 3.5 μm. The average primary particle size of the particle was measured by Coulter counter method. The average primary particle size of the particle is preferably 0.005 μm or more and 3.0 μm or less. Setting the average primary particle size of the particle to 0.001 μm or more facilitates imparting the necessary light cutting property. Setting the average primary particle size of the particle to 3.5 μm or less improves the smoothness of the film surface and reduces defects such as printing omission. The titanium oxide may be in either anatase type or rutile type. The titanium oxide in rutile type is preferred since it generally imparts higher concealing property than that in anatase type.

In order to lower the specific gravity of the film without adverse effect to the whiteness of the white heat-shrinkable polyester-based film, the film preferably has a fine void inside. For example, the void may be formed by mixing and extruding a foaming material or the like. It is preferable to form the void by mixing a thermoplastic resin incompatible with polyester and stretching the resulting material in at least one axial direction. Specific examples of the resin incompatible with polyester include a polystyrene resin, a polyolefin resin, a polyacryl resin, a polycarbonate resin, a polysulfone resin, and a cellulose resin.

The polystyrene resin refers to a thermoplastic resin having a polystyrene structure as a basic constituent. Examples of the polystyrene resin include a homopolymer such as atactic polystyrene, syndiotactic polystyrene and isotactic polystyrene; a modified resin which is obtained by grafted or block copolymerization with other component such as a polystyrene resin having impact resistance and a modified polyphenylene ether resin; and a mixture with a thermoplastic resin compatible with the polystyrene resin such as a mixture with polyphenylene ether.

As the polyolefin resin, a cyclic polyolefin resin is preferable. The cyclic polyolefin resin preferably has a norbornene unit and/or tetracyclododecane unit as a cycloolefin unit. Also, the cyclic polyolefin resin preferably has an acyclic olefin monomer unit and particularly preferably an ethylene unit as the copolymerization unit. As a cycloolefin copolymer, a norbornene-ethylene copolymer and a tetracyclododecane-ethylene copolymer are particularly preferred. Among them, a cyclic polyolefin resin containing an ethylene unit in an amount of 5 to 80% by mass, and preferably 10 to 60% by mass is particularly preferable.

Although a general cyclic polyolefin resin has a glass transition temperature of −20 to 400° C., the cyclic polyolefin resin used in the present invention needs to have a glass transition temperature of 100 to 230° C., and preferably 130 to 200° C. Setting the glass transition temperature to 100° C. or higher facilitates the formation of the void during stretching the film, since Tg is higher than the temperature at the time of stretching an unstretched film. Setting Tg to 230° C. or lower prevent film properties from being ununiform, since homogeneous mixing of the polymer in the extruder is facilitated.

The incompatible resin is preferably contained in the polyester-based resin layer containing titanium oxide. The content of the incompatible resin in the polyester-based resin layer is preferably in the range of 0 to 30% by mass. When the content of the incompatible resin is 0% by mass, the void cannot be formed inside the film and the apparent specific gravity does not decrease, which is not preferable. When no void is formed, the content of the incompatible resin may be 0% by mass. When the content of the incompatible resin is more than 30% by mass, for example, kneading in the extrusion process tends to be ununiform and it is difficult to obtain a stable film, which is not preferable.

In producing a polymer film obtained by mixing the polyester and the incompatible resin, for example, chips of each resin may be mixed and melt-kneaded in an extruder to be extruded, or both resins may be kneaded in advance by a kneader, melt, and extruded from an extruder. In polymerization process of the polyester, the resin incompatible with polyester, such as the polystyrene resin, may be added, and then chips obtained by stirring and dispersing them may be melt and extruded.

The white heat-shrinkable polyester-based film may have at least one layer having the void, particularly a layer containing titanium oxide and the void. The white heat-shrinkable polyester-based film preferably has a layer substantially free of void on one side or both sides of the film. When the layer free of void is formed, stiffness of the film is not reduced, thus a film excellent in the attaching property can be obtained. In addition, the shrinkage ratio of the layer free of void is difficult to decrease.

Further, as necessary, an additive such as a stabilizer, a colorant, an antioxidant, a defoaming agent, an antistatic agent, an ultraviolet absorber may be contained. Also, in order to improve whiteness of the film, a fluorescent brightening agent may be added.

The white heat-shrinkable polyester-based film has the intrinsic viscosity of desirably 0.60 Wig or more. Making the intrinsic viscosity of the heat-shrinkable film equal to or higher than a predetermined value increases the molecular weight of the polyester constituting the film. As a result, durability of shrinkage stress at the time of heat shrinkage can be maintained, and defects such as whitening in shrinkage and uneven shrinkage hardly occur. Thus, shrinkage finish property and appearance are improved. Further, by maintaining the molecular weight of the polyester, the mechanical strength and breakage resistance of the film can be maintained. The intrinsic viscosity is preferably 0.63 Wig or more, and more preferably 0.65 Wig or more.

It is also possible to subject the white heat-shrinkable polyester-based film to corona treatment, coating treatment, flame treatment or the like in order to improve the adhesion of the film surface.

The roll of the white heat-shrinkable polyester-based film has at least one layer of the white polyester-based resin layer containing titanium oxide and satisfies the following requirements (1) to (6):

(1) the length of the film is 1000 m or more and 20000 m or less and the width of the film is 400 mm or more and 10000 mm or less;

(2) the heat-shrinkage ratio in a main shrinkage direction is 50% or more and 85% or less, wherein the heat-shrinkage ratio is measured according to a hot water treatment of a treatment temperature of 98° C. and a treatment time of 10 seconds;

(3) the difference between the maximum and minimum heat-shrinkage ratio in the main shrinkage direction among samples is 0% or more and 3% or less, wherein the heat-shrinkage ratio is measured according to the hot water treatment of a treatment temperature of 98° C. and a treatment time of 10 seconds and the samples are taken from each part of the film divided into five in the film width direction;

(4) the difference between the maximum and minimum heat-shrinkage ratio in the main shrinkage direction among samples is 0% or more and 3% or less, wherein the heat-shrinkage ratio is measured according to the hot water treatment of a treatment temperature of 98° C. and a treatment time of 10 seconds and the samples are taken from the film every 100 m in the film longitudinal direction from the place forming surface layer of the roll of the white heat-shrinkable polyester-based film to the starting place of winding the film;

(5) the difference between the maximum and minimum apparent specific gravity among samples is 0 g/cm³ or more and 0.01 g/cm³ or less, wherein the samples are taken from each part of the film divided into five in the film width direction; and (6) the difference between the maximum and minimum apparent specific gravity among samples is 0 g/cm³ or more and 0.010 g/cm³ or less, wherein the samples are taken from the film every 100 m in the film longitudinal direction from the place forming surface layer of the roll of the white heat-shrinkable polyester-based film to the starting place of winding the film.

It is difficult to homogenize the physical properties values in the width direction and the longitudinal direction of a roll which is obtained from the roll of the white heat-shrinkable polyester-based film, since the film is produced by combining resin chips whose specific gravities are very different due to containing titanium oxide and the produced film is wide. Nevertheless, variations in the physical properties are controlled to be small. Therefore, it is possible to stabilize the quality of the label or the like which is cut out from the roll of the white heat-shrinkable polyester-based film, and it is possible to reduce troubles when the label or the like is processed.

The film width is preferably 500 mm or more, more preferably 1000 mm or more, and further preferably 2000 mm or more.

The heat-shrinkage ratio in the main shrinkage direction which is measured according to the hot water treatment (namely, hot-water shrinkage ratio) is a value calculated from a length before and after shrinkage when treated in a hot water at 98° C. in no load state for 10 seconds. That is, the hot-water shrinkage ratio is calculated according to the following formula; Hot-water shrinkage ratio=((Length before shrinkage−Length after shrinkage)/Length before shrinkage)×100(%). A lower limit of the hot-water shrinkage ratio is preferably 53% or more, and more preferably 56% or more. An upper limit of the hot-water shrinkage ratio is preferably 82% or less, and more preferably 80% or less. The reason for setting the hot-water shrinkage ratio to 50% or more is to secure the shrinkage ratio of the label and to achieve desired shrinkability. The reason for setting the hot-water shrinkage ratio to 85% or less is to prevent jumping up of the label at the time of shrinkage processing. In the case where processing of label attaching with a steam tunnel or the like is assumed, a maximum potential of heat shrinkage in the film is often evaluated at a temperature relatively close to the boiling point of water 100° C. Therefore, the treatment temperature of 98° C. is adopted.

Although the difference between the maximum and minimum hot-water shrinkage ratio in the main shrinkage direction in the width direction of the film forming the roll is practically no problem as long as it is 3% or less, it is more excellent that the difference is preferably 2.5% or less, more preferably 2% or less, and further preferably 1.5% or less. Although the difference between the maximum and minimum hot-water shrinkage ratio in the main shrinkage direction in the longitudinal direction of the film forming the roll is also practically no problem as long as it is 3% or less, it is more excellent that the difference is preferably 2.5% or less, more preferably 2% or less, and further preferably 1.5% or less.

In the present specification, the variation (difference between maximum and minimum value) of physical properties in the film forming the roll (in addition to the hot-water shrinkage ratio in the main shrinkage direction described above, apparent specific gravity, hot-water shrinkage ratio in a direction orthogonal to the main shrinkage direction, total light transmittance, gloss, heat shrinkage stress, solvent adhesive strength, content of amorphous unit, etc., described later), refers to the following. The variation in the width direction refers to the difference between the maximum and minimum value of the physical property among samples which are taken from each part of the film divided into five in the film width direction. For example, the variation in the width direction refers to the difference between the maximum and minimum value of the physical property among samples which are taken from a total of five parts at both ends in the film width direction (two parts), the center in the film width direction (one part), and intermediate portions between the center and the both ends (two parts). The variation in the longitudinal direction refers to the difference between the maximum and minimum value of the physical property among samples which are taken from the film every 100 m in the film longitudinal direction from the place forming surface layer of the roll of the film to the starting place of winding the film.

The white heat-shrinkable polyester-based film has the apparent specific gravity of, for example, 0.8 g/cm$^3$ or more and 1.6 g/cm$^3$ or less. Containing titanium oxide acts on increase of apparent specific gravity and containing the void acts on decrease of apparent specific gravity. Thus, the film can have the desired apparent specific gravity by appropriately adjusting ratios of titanium oxide and the void. The apparent specific gravity may be, for example, 1.0 g/cm$^3$ or more or 1.1 g/cm$^3$ or more, and 1.5 g/cm$^3$ or less.

The difference between the maximum and minimum apparent specific gravity in the width direction of the film forming the roll is practically no problem as long as it is 0.01 g/cm$^3$ or less. Although there is few concern of troubles in the processing process performed continuously like a printing processing process and an attaching process of a PET bottle label due to difference of the stiffness feeling or the like of the film, it is more excellent that the difference is preferably 0.005 g/cm$^3$ or less, and more preferably 0.003 g/cm$^3$ or less. Although the difference between the maximum and minimum apparent specific gravity in the longitudinal direction of the film forming the roll is practically no problem as long as it is 0.010 g/cm$^3$ or less, it is more excellent that the difference is preferably 0.008 g/cm$^3$ or less, and more preferably 0.006 g/cm$^3$ or less.

Other physical properties of the white heat-shrinkable polyester-based film ((a) hot-water shrinkage ratio in a direction orthogonal to the main shrinkage direction, (b) total light transmittance, (c) gloss, (d) heat shrinkage stress, (e) solvent adhesive strength, and (0 content of amorphous unit) and variations in the physical properties in the film forming the roll are also preferably controlled within a predetermined range.

(a) Hot-Water Shrinkage Ratio in Direction Orthogonal to Main Shrinkage Direction The hot-water shrinkage ratio in a direction orthogonal to the main shrinkage direction (hereinafter sometimes simply referred to as orthogonal direction) can be measured in a similar manner to the hot-water shrinkage ratio in the main shrinkage direction, except that a measurement direction of the shrinkage ratio is different. The value of the hot-water shrinkage ratio in the orthogonal direction is greatly different between a uniaxially stretched film and a biaxially stretched film. In the case of the uniaxially stretched film, the hot-water shrinkage ratio in the orthogonal direction is, for example, 10% or less, preferably 5% or less, and more preferably 3% or less.

In the case of the uniaxially stretched film, the difference between the maximum and minimum hot-water shrinkage ratio in the orthogonal direction in the width direction of the film forming the roll is, for example, 3% or less, preferably 2% or less, and more preferably 1% or less. The difference between the maximum and minimum hot-water shrinkage ratio in the longitudinal direction of the film forming the roll is, for example, 3% or less, preferably 2% or less, and more preferably 1% or less.

(b) Total Light Transmittance

The white heat-shrinkable polyester-based film has the total light transmittance of, for example, 40% or less, preferably 35% or less, more preferably 30% or less, and further preferably 20% or less. When the film has the total light transmittance of 40% or less, contents are hard to be seen through, and printed matter is easily seen, thus the appearance is excellent. For the similar reason, whiteness is, for example, 70 or more, preferably 75 or more, and more preferably 80 or more.

The difference between the maximum and minimum total light transmittance in the width direction of the film forming the roll is, for example, 3% or less, preferably 2% or less, and more preferably 1.5% or less. The difference between the maximum and minimum total light transmittance in the longitudinal direction of the film forming the roll is, for example, 3% or less, preferably 2% or less, and more preferably 1.5% or less. The smaller the difference between the maximum and minimum total light transmittance is, the more variation in appearance can be suppressed.

(c) Gloss

In the white heat-shrinkable polyester-based film, the gloss measured at 60 degrees angle is preferably 40% or more and 150% or less on both sides of the film. When the film has the gloss of 40% or more, it is possible to prevent the ink omission during printing and to make the appearance beautiful. The lower limit of the gloss is more preferably 43% or more, and further preferably 46% or more. The higher gloss is, the better since printing is improved. However, in the case of the white heat-shrinkable polyester-based film, the limit of the gloss is about 150%, and it may be about 120%.

The difference between the maximum and minimum gloss in the width direction of the film forming the roll is, for example, 5% or less, preferably 3% or less, and more preferably 2% or less, on both sides of the film. The difference between the maximum and minimum gloss in the longitudinal direction of the film forming the roll is, for example, 5% or less, preferably 4% or less, and more preferably 3% or less on both sides of the film. The smaller the difference between the maximum and minimum gloss is, the more the variation in appearance can be suppressed.

(g) Heat Shrinkage Stress

In the white heat-shrinkable polyester-based film, the heat shrinkage stress in the main shrinkage direction, wherein the heat shrinkage stress is measured according to a hot air treatment of a treatment temperature of 90° C., is desirably 9 MPa or less. When the film has the heat shrinkage stress of 9 MPa or less, the shrinkage rate becomes slow and the shrinkage finish property can be improved. The upper limit of the heat shrinkage stress is more preferably 8 MPa or less, and further preferably 7 MPa or less. It is preferable that the heat shrinkage stress is lower. However, from the viewpoint of preventing slack of the label after heat shrinkage, for example, the heat shrinkage stress is, for example, 1 MPa or more, and further preferably 1.5 MPa or more.

The difference between the maximum and minimum heat shrinkage stress in the width direction of the film forming the roll is, for example, 1 MPa or less, preferably 0.2 MPa or less, and more preferably 0.15 MPa or less. The difference between the maximum and minimum heat shrinkage stress in the longitudinal direction of the film forming the roll is, for example, 1 MPa or less, preferably 0.7 MPa or less, and more preferably 0.4 MPa or less. The smaller the difference in the heat shrinkage stress is, the more variation in shrinkage finish property can be suppressed, which is preferable.

(e) Solvent Adhesive Strength

The solvent adhesive strength of the white heat-shrinkable polyester-based film is a value measured as a peeling resistance after applying 1,3-dioxolane in an amount of 5±0.3 g/m² and an application width of 5±1 mm to the film and then sticking two sheets of the film together to seal. The solvent adhesive strength is preferably 2 N/15 mm width or more and 10 N/15 mm width or less. When the solvent adhesive strength is 2 N/15 mm width or more, it is possible to prevent the label from easily peeling off from a solvent adhesive part after heat shrinkage. The lower limit of the solvent adhesive strength is more preferably 3 N/15 mm width or more, and further preferably 4 N/15 mm width or more. Although the higher solvent adhesive strength is preferable, the upper limit of the solvent adhesive strength is considered to be about 10 N/15 mm width as of now in terms of performance of a film forming apparatus. Also, when the solvent adhesive strength is too high, in a case where two sheets of the film are bonded with a solvent to form a label, a situation that the sheet is bonded to an unnecessary film tend to occur, and productivity of the label may be lowered. Accordingly, the solvent adhesive strength may be even 7 N/15 mm width or less in view of practical use.

(f) Content (Mol % by Mass) of Amorphous Unit

A content of amorphous unit (for example, the total of a unit derived from isophthalic acid and a unit derived from at least one selected from the group consisting of neopentyl glycol and cyclohexane dimethanol) in the white heat-shrinkable polyester-based film is, for example, 14 mol % by mass or more, preferably 16 mol % by mass or more, and further preferably 18 mol % by mass or more, and for example, 40 mol % by mass or less, preferably 35 mol % by mass or less, and more preferably 30 mol % by mass or less.

The difference between the maximum and minimum content of the amorphous unit in the width direction of the film forming the roll is, for example, 2 mol % by mass or less, preferably 0.5 mol % by mass or less, and more preferably 0.3 mol % by mass or less. The difference between the maximum and minimum content of the amorphous unit in the longitudinal direction of the film forming the roll is, for example, 2 mol % by mass or less, preferably 1.5 mol % by mass or less, and more preferably 1 mol % by mass or less. The smaller the difference in the amount of the amorphous unit is, the more variation in shrinkage finish property can be suppressed, which is preferable.

Although a thickness of the white heat-shrinkable polyester-based film is not particularly limited, it is preferably 30 µm or more and 60 µm or less when assuming the use of the film as a heat-shrinkable film for label.

When the white heat-shrinkable polyester-based film is a void-free film only mixed with titanium oxide, it may be a single layer or multiple layers, and the thickness of each layer is not also particularly limited. On the other hand, when the white heat-shrinkable polyester-based film is a void-containing white heat-shrinkable polyester-based film, the thickness of each layer is not particularly limited, however it is preferably 3 µm or more respectively.

In the void-containing white heat-shrinkable polyester-based film, the void-free layer is preferably provided as a surface layer. For example, a void-free layer is set to be layer A, a void-containing layer is set to layer B, and either the void-free layer or the void-containing layer is set to be layer C. Then, a layer constitution of the film is desirably A/B/A, A/C/B/C/A, or the like. By adopting the above layer constitution, it is possible to suppress curl during heat shrinkage as compared with other layer constitutions. A thickness ratio of the layer A and the layer B (B/A) is preferably 3/2 or more, and more preferably 2/1 or more. By increasing the thickness of the layer B, it is possible to achieve both low apparent specific gravity and good appearance.

The difference in thickness of the void-free layer formed on both surface layers (both outer layers) of the void-containing white heat-shrinkable polyester-based film is desirably 2 µm or less. Since the void-free layer has a large influence on shrinkage, it is easy to prevent troubles of curling and poor finish during heat shrinkage by reducing the difference in thickness between the two void-free layers. The upper limit of the difference in thickness between both outermost layers of the film, which are void-free layers, is more preferably 1.5 µm or less, and further preferably 1 µm or less. The lower limit is preferably lower since there is no curling or poor finish. The ideal difference in thickness is 0 µm.

The thicknesses of the void-free layers on both sides of the void-containing white heat-shrinkable polyester-based film are desirably both 3 µm or more and 12 µm or less. The thickness of the void-free layer relates to an uneven state of the film surface, and thus relates to printability. Also, when the thickness is too large, the specific gravity of the film becomes high, which is not preferable as the void-containing film. The lower limit of the thickness of the void-free layer is more preferably 3.5 µm or more, and further preferably 4 µm or more. The upper limit of the thickness of the void-free layer is more preferably 11.5 µm or less, and further preferably 11 µm or less.

As described above, the roll of the white heat-shrinkable polyester-based film of the present invention has the white polyester-based resin layer containing titanium oxide. The roll containing titanium oxide is produced by supplying a white polyester-based resin chip containing titanium oxide and another raw material resin chip to an extruder with a hopper and mixing them, melting and extruding a mixture of the white polyester-based resin chip and the raw material resin chip followed by roll-cooling (for example, cooling by a conductive roll such as a casting roll) to make a extruded film, heating and stretching the extruded film in a width direction The roll of the white heat-shrinkable polyester-based film having a layer other than the titanium oxide-containing layer is produced by multilayer extrusion as appropriate.

A master batch is usually used as the white polyester-based resin chip containing titanium oxide. Thus, the titanium oxide is contained in the range of about, for example, 10% by mass or more, preferably 20% by mass or more, and further preferably 30% by mass or more, and for example, 80% by mass or less, preferably 70% by mass or less, and more preferably 60% by mass or less. Therefore, the white polyester-based resin chip containing titanium oxide having a larger specific gravity than other resin chips. Nevertheless the roll of the white heat-shrinkable polyester-based film of the present invention is produced as a film roll with wide width while stabilizing the physical properties in both the width direction and the longitudinal direction. In order to produce the roll of the white heat-shrinkable polyester-based film of the present invention described above, it is necessary to properly mix the resin chips, and also properly extrude, cool and stretch the mixture.

Upon mixing the resin chips, it is preferable that the other raw material resin chip described above is supplied to the hopper from above, also the white polyester-based resin chip is supplied to the extruder through a pipe (hereinafter sometimes referred to as an inner pipe) whose outlet is located in the hopper and right and immediately above the extruder, and then both chips are mixed, melted, and extruded. When a mixture of the titanium oxide-containing chip and the other resin chip are put into the hopper on the extruder, there is a concern that the titanium oxide-containing chip having the large specific gravity may cause segregation of raw materials in the hopper. In particularly, there is a high concern that the segregation of raw materials occurs at a portion where the inner wall of the hopper is not vertical (oblique part). However, when the titanium oxide-containing chip is directly supplied to the part in the hopper and right and immediately above the extruder through the inner pipe, the segregation of raw materials can be reduced even when the specific gravity is large. Therefore, it is possible to stably produce the white heat-shrinkable polyester-based film in an industrial manner.

An example of a specific mixing procedure is shown in FIG. 1. FIG. 1 is a schematic view showing an example of a relationship between an extruder 2 with a hopper 1 and an inner pipe 3. FIG. 2 is an enlarged view of a portion A in FIG. 1. As shown in FIG. 1 and FIG. 2, the titanium oxide-containing resin chip is supplied through the inner pipe 3, and the other resin chip is supplied from the upper part of the hopper 1. Since an outlet 4 of the inner pipe 3 is located right and immediately above the extruder (precisely, right and immediately above a resin supply port 5 of the extruder 2), the mixing ratio of the titanium oxide-containing chip can be kept constant.

A height (H2) of the outlet 4 of the inner pipe 3 preferably satisfies the following Formula 1, and more preferably satisfies of both Formulae 1 and 2.

$$H2 < H1 \quad \text{(Formula 1)}$$

wherein H1 indicates a height of a part where the inner wall of the hopper is vertical (see FIG. 2).

$$0.5 \times L/\tan\theta < H2 \quad \text{(Formula 2)}$$

wherein L is an inner diameter of the outlet 4 of the inner pipe 3 (see FIG. 2), and $\theta$ is an angle of repose of the other resin chip.

By setting the height of H2 to larger than $0.5 \times L/\tan\theta$, the position (H3; see FIG. 2) where the titanium oxide-containing chip is mixed with the other resin chip can be made external of the extruder. Thus, the forming air bubbles by entry of air into the extruder can be prevented.

The height H3 (=H2·$0.5 \times L/\tan\theta$) which shows the height of the mixing position of the titanium oxide-containing chip is desirably higher than 0 m and less than 2 m. By setting the height H3 to higher than 0 m, entry of air into the extruder can be prevented. Also, by setting the height H3 to less than 2 m, the distance to the extruder can be kept short, and the segregation of raw materials can be prevented. The height H3 is preferably 0.3 m or more and 1.7 m or less, and further preferably 0.6 m or more and 1.4 m or less.

The extrusion temperature is preferably about 250° C. to 290° C. When the extrusion temperature is set to 250° C. or higher, it is possible to reduce a load to a permissible range. Also, when the extrusion temperature is set to 290° C. or lower, thermal deterioration of the polyester resin in the extruder can be prevented, and reduction in mechanical strength of the resulting film can be suppressed.

In the case of producing a laminated film by multilayer extrusion, any of the layers containing titanium oxide is preferably mixed by above mixing procedure. The difference between extrusion temperatures of two adjacent layers is preferably ±10° C. or lower. By matching the temperatures of extruded resin of two adjacent layers, a difference in melt viscosity can be reduced, and the layer ratios in the width direction of the adjacent two layers can be matched in an unstretched film.

After extruding the molten resin from the extruder, it is common to solidify the molten resin with a cooling roll to form an unstretched film. However, recently, in order to increase production efficiency of the film, the rotational speed of the cooling roll is increased and a cooling capacity is not enough. As a result, the degree of crystallinity of the unstretched film varies in the longitudinal direction and width direction of the film, thus variations in quality tend to occur. Particularly, since the film of the present invention is widened, it is required to reduce variations in the degree of crystallinity. Then, after the film is contacted the cooling roll, cold air is supplied to a non-contact surface. Insufficient cooling can be solved by cold air, and the degree of crystallinity of the non-contact surface can be reduced to suppress the variations.

It is preferable to use an apparatus capable of supplying cold air having wide width so that the cold air is blown to the entire width direction of the film. When the molten resin is discharged from a die, the end portion of the unstretched film is thicker than the central portion by neck-in. Thus, the wind velocity during cooling is preferably adjusted to be higher in the end portion than in the central portion. The wind velocity is adjusted, for example, by using a punching plate. It is more preferable to control a difference in wind velocity between the end portion with high wind velocity and the central portion in the width direction with slow wind velocity to 5% or less of the wind velocity of the end portion.

It is also preferable to control the cold air so that the difference in the wind velocity in the longitudinal direction is 1 m/second or less. By setting the difference in wind velocity in the longitudinal direction to 1 m/second or less, a difference of irregularity of thickness in the longitudinal direction of the unstretched film can be reduced, and occurrence of differences of physical properties in the longitudinal direction of the film can be prevented.

The temperature of the cold air is preferably set to lower than the temperature of the cooling roll by 3 to 15° C. The heat transfer coefficient of the cold air is lower than that of the cooling roll. Thus, the degree of cooling of both sides of the film can be matched by setting the temperature of the cold air to lower than that of the cooling roll by 3° C. or higher, which is preferable. Also, by setting the temperature of the cold air to the temperature of the cooling roll −15° C. or higher than the temperature of the cooling roll −15° C., occurrence of dew condensation on the cooling roll can be prevented.

The cold air velocity is preferably 4 m/second or more and 25 m/second or less, although it depends on the cooling solidification rate. By setting the cold air velocity to 4 m/second or more, a desired cooling effect can be obtained. By setting the cold air velocity to 25 m/second or less, fluctuation of the molten resin in contacting point to the cooling roll can be prevented, and irregularity of thickness can be reduced.

Next, the unstretched film is stretched in at least one direction. Generally, the unstretched film is uniaxially stretched in a transverse direction (width direction), after uniaxially stretching in a longitudinal direction or without longitudinally stretching. Before stretching the film in the transverse direction, it is necessary to heat the film. The heating temperature is within the range of Tg of the film+10° C. to Tg of the film+30° C., and then transverse stretching is carried out. The transverse stretch ratio is, for example, 3.4 times or more and 7.0 times or less, and preferably 3.6 times or more and 6.5 times or less. The temperature during transverse stretching is, for example, a predetermined temperature within the range of Tg−5° C. to Tg+15° C. When the heating temperature, the stretching temperature, and the stretch ratio are set to certain values or more, the unstretched film can be stretched and heat shrinkability can be imparted to the film. In the case of producing the void-containing film, when the heating temperature and the stretching temperature are lowered within a stretchable range and the stretch ratio is increased, the stress during stretching is increased and the void can made large. Thus, it is effective to lower the apparent density. Also, the higher the stretching ratio is, the higher the stress during stretching is, and the void can be made large and the apparent density can be lowered.

Incidentally, since the roll of the white heat-shrinkable polyester-based film of the present invention is widened, it is difficult to reduce a temperature difference in the width direction. Therefore, in order to reduce the temperature difference in the width direction even during stretching of such the wide film, a procedure for further stabilizing temperature in film heating is adopted. Specifically, it is desirable that, when the film is heated in order to stretch the film in the main shrinkage direction (transverse direction in this example), the heating of the extruded film is performed by using hot air supply nozzles (a) from one heat source and hot air supply nozzles (b) from another heat source, the air supply nozzles (a) and the air supply nozzles (b) are arranged alternately (in a staggered manner) along flow direction of the film, the heat source connecting to the air supply nozzles (a) is disposed on one side in the width direction of the extruded film, and the heat source connecting to the air supply nozzles (b) is disposed on the other side. Since the transfer distance of hot air from the heat source tends to be long in a wide film, the film temperature of a side which is far from the heat source tends to be lower. However, by arranging the hot air supply nozzles connected to the heat sources disposed on both sides alternately (in a staggered manner), the temperature difference of heating can be reduced even in a wide film.

An example of the heating method is shown in FIG. 3. In FIG. 3, heat sources 11a, 11b (heaters of a heat exchanger in the illustrated example) are disposed on both sides in a transverse direction of a film 10. Nozzles 12a, 12b that supply hot air from each of the heaters toward the film are separately connected to the respective heaters 11a, 11b and are alternately arranged along a longitudinal direction (TD) of the film. The hot air is supplied from the heaters 11a, 11b toward the nozzles 12a, 12b through pipes 13a, 13b by a fan (not shown), and supplied from hot air supply ports 14a, 14b which provided in the respective nozzles 12a, 12b toward the film 10. With such arrangement, the hot air supply ports (parts surrounded by the chain line in the FIG. 3) which are close to the heat source (heater) are arranged in a staggered manner, so that it is possible to uniformly heat the film even when a film width W is large. In the illustrated example, the nozzles 12a, 12b are disposed on one side of the film, but nozzles which are not shown are also disposed on the opposite side of the film so as to face the nozzles 12a, 12b. The nozzles on the opposite side are also alternately connected to the heat sources 11a, 11b, similarly to the nozzles 12a, 12b.

By adopting the arrangement of the nozzles as described above, the temperature difference in width direction of the film can be, for example, ±1° C. or lower even when the film is wide. Not only in a heating zone but also in a transverse stretching zone and a heat setting zone, nozzles arranged in the longitudinal direction of the film may be alternately connected to the heat sources disposed on both sides of the film as in the above description.

From the viewpoint of controlling heat shrinkage stress or the like of the film, the number of step of stretching is preferably large, however in order to avoid difficulty in designing stretching equipment, the upper limit of the number of steps may be set, and for example, the number of steps may be set to six steps or less, and preferably four steps or less.

After stretching the film, it is preferable to perform heat setting of the film. The temperature of heat setting is, for example, within the range of Tg+5° C. to Tg+50° C. When the temperature of heat setting is higher than Tg+50° C., the shrinkage ratio in the width direction of the film becomes small. Thus, even when a void is required, the void may be crushed. The heat setting may be carried out in a state of being tense in a stretching direction of the film. The tension rate at that time is desirably 6% or less.

The roll of the white heat-shrinkable polyester-based film can be formed into a heat-shrinkable label or a packaging material by a known method. Specifically, a white heat-shrinkable polyester-based film cut out into a desired width is subjected to an appropriate printing, and the left and right end portions of the film are stacked and bonded by solvent bonding or the like to produce a tube film. The tube film is cut out into an appropriate length to obtain a tube-like label. As an organic solvent for bonding, a cyclic ether such as 1,3-dioxolane and tetrahydrofuran are preferable. Besides, an aromatic hydrocarbon such as benzene, toluene, xylene and trimethylbenzene; a halogenated hydrocarbon such as methylene chloride and chloroform; a phenol such as phenol, or a mixture thereof can be used.

After providing perforations on the above label by a known method, a container such as a PET bottle is covered with the label, placed on a conveyor belt or the like, and allowed to pass through the inside of a shrinkage tunnel (steam tunnel) for blowing steam or a shrinkage tunnel (hot air tunnel) for blowing hot air. The label shrinks by heat during passing through the tunnel, whereby the label after heat shrinkage is attached on the container.

When the roll of the white heat-shrinkable polyester-based film is used to obtain the packaging material, examples of a object to be wrapped include PET bottles for beverages, various kinds bottles, cans, plastic containers for confections, box lunches and the like, paper-made boxes, and the like. Normally, in the case where the heat-shrinkable label is covered on the object to be wrapped and heat-shrunk, the label is heat-shrunk by about 5 to 70% and closely attached on the package. The label that covers the objects to be wrapped may be printed or may not be printed.

This application claims benefit of priority based on Japanese Patent No. 2016-190407 filed on Sep. 28, 2016. The entire content of the specification of Japanese Patent No. 2016-190407 filed on Sep. 28, 2016 is incorporated herein by reference.

EXAMPLES

Next, the present invention will be specifically described with reference to examples and comparative examples, but the present invention is not limited to the aspects of the examples at all, and can be appropriately modified within the scope not departing from the gist of the present invention.

The evaluation methods used in the present invention are as follows.

[Heat Shrinkage Ratio in Width Direction (Main Shrinkage Direction) and Heat-Shrinkage Ratio in Longitudinal Direction]

A heat-shrinkable film was cut out into a square of 10 cm×10 cm along a longitudinal direction (a direction orthogonal to a main shrinkage direction) and a width direction (main shrinkage direction), the cut out sample was dipped in hot water with a temperature of 98° C.±0.5° C. in a no-load state for 10 seconds to be heat-shrunk, followed by being immediately dipped in water at 25° C.±0.5° C. for 10 seconds, and then pulled out from the water. A dimension in the width direction (main shrinkage direction) and a dimension in the longitudinal direction (orthogonal direction) of the film were respectively measured, and a heat-shrinkage ratio was determined according to the following equation.

Heat-shrinkage ratio in width direction=((length in width direction before shrinkage−length in width direction after shrinkage)/length in width direction before shrinkage)×100(%)

Heat-shrinkage ratio in longitudinal direction= ((length in longitudinal direction before shrinkage−length in longitudinal direction after shrinkage)/length in longitudinal direction before shrinkage)×100(%)

[Total Light Transmittance]

A total light transmittance was determined with NDH-1001DP manufactured by NIPPON DENSHOKU INDUSTRIES CO., LTD.

[Gloss]

In accordance with JIS K8741, gloss was measured at 60 degrees angle by using a gloss meter "VG2000" (manufactured by NIPPON DENSHOKU INDUSTRIES CO., LTD.). Raw materials were melted and discharged from an extruder, and both on a surface in contact with a cooling roll and a surface not in contact with the cooling roll were measured.

[Apparent Specific Gravity of Heat-Shrinkable Film]

A heat-shrinkable film was cut out into four pieces of 5 cm squares as a sample. Four pieces of the samples were stacked, and an average value of stacking thicknesses was obtained by measuring a total thickness at 10 different points in four significant figures using a micrometer. This average value was divided by 4 and the resultant value was rounded to three significant figures to obtain an average thickness per piece (t: μm). Mass (w: g) of four pieces of the samples was measured in four significant figures using an automatic even balance, and an apparent specific gravity was determined by the following equation. Additionally, the apparent specific gravity was rounded so that the number of fractional digits after a decimal point was three.

Apparent specific gravity(g/cm$^3$)=$w$/(5×5×$t$×10$^{-4}$×4)=$w$×100/$t$

[Heat Shrinkage Stress]

A sample having a length of 160 mm in a main shrinkage direction and a width of 20 mm was cut out from a heat-shrinkable film and set in a TENSILON (with a heating furnace) of a strength and elongation measuring machine manufactured by ORIENTEC Co., LTD., which had been previously heated to 90° C. with hot air, after blowing was stopped. Specifically, the cut sample was pinched between cardboard pieces of 30 mm×28 mm at chucking position, and the sample was attached to chucks so that the distance between chucks was set to of 100 mm. Thereafter, a stress detected when quickly closing doors of the heating furnace and starting blowing (blowing wind velocity 5 m/second) was measured for 30 seconds, and the maximum value obtained from a chart was defined as a heat shrinkage stress (MPa).

[Solvent Adhesive Strength]

1,3-Dioxolane was applied to a heat-shrinkable film in an amount of 5±0.3 g/m$^2$ and an application width of 5±1 mm, and two sheets were stuck together for sealing. Thereafter, the resulting material was cut out into a width of 15 mm in the direction orthogonal to the sealing direction, which was set at 20 mm chuck interval to a universal tensile tester STM-50 manufactured by Baldwin Co., Ltd., and tensile peeling was carried out in a condition of a tensile speed of 200 mm/min to measure peeling resistance. The strength at that time was defined as solvent adhesive strength.

[Content of Amorphous Unit]

A heat-shrinkable film was sampled by scraping off with a razor blade. Approximately 5 mg of the sampled film was dissolved in 0.7 ml of a mixed solution of deuterated chloroform and trifluoroacetic acid (volume ratio 9/1), an amount of amorphous units (neopentyl glycol unit and cyclohexanedimethanol unit in the following example) was calculated using $^1$H-NMR (manufactured by Varian, UNITY50), and then the mol % (total of a ratio of polyol type amorphous unit based on 100 mol % of polyol unit, and a ratio of polycarboxylic acid type amorphous unit based on 100 mol % of polycarboxylic acid unit) thereof was determined. A product of the amount (% by mass) of polymers in the film and the mol % above was defined as a content (mol % by mass) of the amorphous units.

[Temperature Difference in Width Direction of the Film]

Using a non-contact type infrared thermometer, a film was stretched in the width direction with a transverse stretching machine and then divided into five in the width direction. The temperature of each part was measured, and the difference between the maximum and minimum temperature among part was defined as the temperature difference in the width direction of the film.

[Shrinkage Finish Property]

A heat-shrinkable film was slit in a longitudinal direction and divided into a plurality of films, and then two-color printing with green and gold ink of Toyo Ink Mfg. Co., Ltd. was provided previously. Then, by bonding both end portions of the printed film with dioxolane, a cylindrical-form label (label in which the main shrinkage direction of the heat-shrinkable film was the circumferential direction) was prepared with a length of 4000 m, and samples are taken from the label every 100 m (the number of samples is 41). Thereafter, using a steam tunnel (model: SH-1500-0 manufactured by Fuji Astec Inc., an attachment test of the sampled labels was performed using a 500 ml PET bottle (a trunk diameter of 70 mm, a minimum diameter of a neck part of 25 mm) at a zone temperature of 95° C. with a passing time of 5 seconds. At the time of the attachment, in the neck part, a portion with a diameter of 30 mm was adjusted to be one end of the label. The evaluation was carried out visually, and criteria were as follows.

Good: None of wrinkle, jumping up and insufficient shrinkage occurred in all 41 samples Poor: Wrinkle, jumping up or insufficient shrinkage occurred in one or more in 41 samples

[Label Height]

As evaluation of finish property after shrinkage, a height of an upper part of the attached label was measured with a gauge, and a difference in the height of the 41 labels was determined to evaluate variations. Criteria were as follows.

Good: Difference in height was less than 2 mm
Poor: Difference in height was 2 mm or more
Raw material resin chips used in examples are as shown in Table 1.

The production method of the film is summarized in Table 2, and the evaluation results of the resulting films are shown in Table 3. In Table 3, the items expressed as difference in physical property in the width direction mean differences

TABLE 1

| | Dicarboxylic acid component (mol %) | Polyol component (mol %) | | | Intrinsic viscosity | Polystyrene | Titanium oxide |
|---|---|---|---|---|---|---|---|
| | DMT | EG | NPG | CHDM | (d l/g) | (% by mass) | (% by mass) |
| Polyester (a) | 100 | 100 | — | — | 0.75 | — | — |
| Polyester (b) | 100 | 70 | 30 | — | 0.78 | — | — |
| Polyester (c) | 100 | 70 | — | 30 | 0.78 | — | — |
| Polyester (d) | Polyester (a): 50% by mass | | | | | — | 50 |
| | Product name "ET550" manufactured by Nippon Pigment Co., Ltd. | | | | | — | — |
| Raw material (e) | Polyester (a): 50% by mass | | | | | 50 | — |
| | Product name "HRM26" manufactured by TOYO STYRENE Co., Ltd. | | | | | | |

As titanium oxide in the table, rutile type titanium oxide (average primary particle size of 0.2 μm) manufactured by SAKAI CHEMICAL INDUSTRY CO., LTD. was used. Also, abbreviations in the table are as follows.
DMT: dimethyl terephthalate
EG: ethylene glycol
NPG: neopentyl glycol
CHDM: cyclohexane dimethanol Example 1

A film having three-layer constitution was formed using three extruders. All of layers A, B and C were made from the same raw materials. As the raw materials, 5% by mass of polyester (a), 75% by mass of polyester (b), and 20% by mass of polyester (d) were used. Here, polyester (d) was added using an inner pipe as shown in FIG. 1 so as to be mixed with other raw materials immediately before entering the extruder. At this time, a height (H2) of the inner pipe from the extruder was 1.5 m. An angle of repose when the polyesters (a) and (b) were mixed in the above mass ratio was 40 degrees. A diameter of the inner pipe was 0.2 m, and height H3 shown in FIG. 2 was about 1.38 m.

All of the layers A, B and C were melted at 280° C. and co-extruded from a T die so that a layer thickness ratio was layer A/layer B/layer C=20/60/20, and rapidly cooled with a cooling (chill) roll to obtain an unstretched multilayer film with a thickness of 200 μm. At this time, the cooling roll was in contact with the layer A at 25° C. To the layer C opposite to the cooling roll, cold air at 10° C. was blown at 8 m/s at the central portion and 10 m/s at the end portion using a multi-duct. Also, a take-up speed of the cooling roll was 80 m/minute.

The unstretched film was led to a transverse stretching machine (tenter). This tenter is a zone to apply all temperatures, and has a system for supplying hot air from a heater of a heat exchanger to heat. A hot air supply port was disposed in a staggered manner (in zigzag) as shown in FIG. 3. After preheating until the temperature of the film reached 90° C., the film was stretched in a width (transverse) direction with the tenter. The film was stretched to five times at 80° C. A temperature difference in the film width direction after stretching was 0.8° C. Subsequently, the stretched film was heat-set at 82° C. while maintaining the width of the film at completion of stretching to obtain a white heat-shrinkable polyester-based film with a thickness of 40 μm, a winding length of 4000 m, and a length in the width direction of 4 m.

between the maximum and minimum physical property which measured using samples taken from positions divided into five in the width direction of the film having the width of 4 m. That is, the samples were taken from a total of five parts at positions at both ends, positions at 1 m from the end portions, and a position at the central portion at 2 m from the end portions. The physical property herein refer to shrinkage ratio, apparent specific gravity, total light transmittance, gloss, heat shrinkage stress or content of amorphous units. Also, the items expressed as difference in physical property in the longitudinal direction mean differences between the maximum and minimum physical property obtained by measuring a surface layer at the central portion in a width direction of the film with the winding length of 4000 m, and measuring using samples taken from a total of 41 parts at intervals of 100 m of the film with a rewinding machine. The physical property herein refer to shrinkage ratio, apparent specific gravity, total light transmittance, gloss, heat shrinkage stress or content of amorphous units. Moreover, in Table 3, the measurement value of each physical property means the average value of the measurement values of the samples (a total of 41 parts) sampled every 100 m in the longitudinal direction at the central portion in the width direction. A good film with a small difference in physical property of the film in the width direction and the longitudinal direction was obtained.

Example 2

A white heat-shrinkable polyester-based film with a thickness of 40 μm, a winding length of 4000 m, and a length in the width direction of 4 m was obtained in the same manner as in Example 1, except that polyester (b) of Example 1 was changed to polyester (c). An angle of repose when polyesters (a) and (c) were mixed in the above mass ratio was 40 degrees as in Example 1. The summary of the film production method is shown in Table 2, and the evaluation results of the resulting films are shown in Table 3. A good film with a small difference in physical property of the film in the width direction and the longitudinal direction was obtained.

Example 3

The raw materials of each layer of Example 1 were changed. The layer A and the layer C were formed in a ratio of 10% by mass of polyester (a) and 90% by mass of polyester (b). Since polyester (d) containing titanium oxide was not used as raw material, the inner pipe on the extruder was not used.

The layer B was formed by using 80% by mass of polyester (b) and 20% by mass of polyester (d). Polyester (d) entered the extruder through the inner pipe. An angle of repose of polyester (b) was 40 degrees. All of the layers A, B and C were melted at 280° C. and co-extruded from a T die so that a layer thickness ratio was layer A/layer B/layer C=20/60/20, and rapidly cooled with a cooling (chill) roll to obtain an unstretched multilayer film with a thickness of 200 μm. Subsequently, the unstretched multilayer film was stretched in the same manner as in Example 1 to obtain a white heat-shrinkable polyester-based film with a thickness of 40 μm, a winding length of 4000 m, and a length in the width direction of 4 m. The summary of the film production method is shown in Table 2, and the evaluation results of the resulting films are shown in Table 3. A good film with a small difference in physical property of the film in the width direction and the longitudinal direction was obtained.

Example 4

The ratio of raw materials of layer B of Example 3 was changed. The layer B was formed by using 60% by mass of polyester (b), 20% by mass of polyester (d), and 20% by mass of raw material (e). Polyester (d) entered the extruder through the inner pipe. An angle of repose of the mixture of polyester (b) and raw material (e) was 38 degrees. All of the layers A, B and C were melted at 280° C. and co-extruded from a T die so that a layer thickness ratio was layer A/layer B/layer C=20/60/20, and rapidly cooled with a cooling (chill) roll to obtain an unstretched multilayer film with a thickness of 200 μm. Subsequently, the unstretched multilayer film was stretched in the same manner as in Example 1 to obtain a void-containing white heat-shrinkable polyester-based film with a thickness of 45 μm, a winding length of 4000 m, and a length in the width direction of 4 m. The summary of the film production method is shown in Table 2, and the evaluation results of the resulting films are shown in Table 3. A good film with a small difference in physical property of the film in the width direction and the longitudinal direction was obtained.

Comparative Example 1

In the same manner as in Example 1, a film having three-layer constitution was formed using three extruders. All of the layers A, B and C were made from the same raw materials. As raw materials, 5% by mass of polyester (a), 75% by mass of polyester (b), and 20% by mass of polyester (d) were used. However, polyester (a), polyester (b) and polyester (d) were all entered in the extruder in a mixed state. That is, polyester (d) entered the extruder in a state of being mixed with other raw materials in advance, without using the inner pipe. A height H1 at this time was 5 m.

All of the layers A, B and C were melted at 280° C. and co-extruded from a T die so that a layer thickness ratio was layer A/layer B/layer C=20/60/20, and rapidly cooled with a cooling (chill) roll to obtain an unstretched multilayer film with a thickness of 200 μm. At this time, the cooling roll was in contact with the layer A at 25° C. To the layer C opposite to the cooling roll, cold air at 10° C. was blown at 8 m/s at the central portion and 10 m/s at the end portion using a multi-duct. Also, a take-up speed of the cooling roll was 80 m/minute.

The unstretched film was led to a transverse stretching machine (tenter). This tenter is a zone to apply all temperatures, and has a system for supplying hot air from a heater of a heat exchanger to heat. A hot air supply port was disposed in a staggered manner (in zigzag) as shown in FIG. 3. After preheating until the film temperature reached 90° C., the film was stretched in a width (transverse) direction with the tenter. The film was stretched to five times at 80° C. A temperature difference in the film width direction after stretching was 0.9° C. Subsequently, the stretched film was heat-set at 82° C. while maintaining the width of the film at completion of stretching to obtain a white heat-shrinkable polyester-based film with a thickness of 40 μm, a winding length of 4000 m, and a length in the width direction of 4 m.

The summary of the film production method is shown in Table 2, and the evaluation results of the resulting films are shown in Table 3. The physical properties of the film in the width direction and the longitudinal direction were measured. As compared to Example 1, differences of the physical property particularly in the longitudinal direction were large, and it was inferior as a film continuously produced in an industrial manner.

Comparative Example 2

Polyester (d) in the layer B of Example 4 entered the extruder in a state of being mixed with other raw materials in advance, without using the inner pipe. A height H1 at this time was 5 m. A void-containing white heat-shrinkable polyester-based film with a thickness of 45 μm, a winding length of 4000 m and a length in the width direction of 4 m was obtained under the same conditions as in Example 4 except for the above. The evaluation results of the resulting film are shown in Table 3. As compared to Example 1, differences of the physical property particularly in the longitudinal direction were large, and it was inferior as a film continuously produced in an industrial manner.

TABLE 2

|  |  | Example 1 | | | Example 2 | | | Example 3 | | |
|---|---|---|---|---|---|---|---|---|---|---|
|  |  | Layer A | Layer B | Layer C | Layer A | Layer B | Layer C | Layer A | Layer B | Layer C |
| Mixing ratio of resin chips (% by mass) | Polyester (a) | 5 | 5 | 5 | 5 | 5 | 5 | 10 |  | 10 |
|  | Polyester (b) | 75 | 75 | 75 |  |  |  |  | 80 |  |
|  | Polyester (c) |  |  |  | 75 | 75 | 75 | 90 |  | 90 |
|  | Polyester (d) (containing TiO$_2$) | 20 | 20 | 20 | 20 | 20 | 20 |  | 20 |  |
|  | Raw material (e) (containing polystyrene) |  |  |  |  |  |  |  |  |  |
| Mixing condition | Inner pipe for polyester (d) | Use | Use | Use | Use | Use | Use | Unnecessary | Use | Unnecessary |
|  | Diameter (m) | 0.2 | 0.2 | 0.2 | 0.2 | 0.2 | 0.2 |  | 0.2 |  |
|  | Height H2 (m) | 1.5 | 1.5 | 1.5 | 1.5 | 1.5 | 1.5 |  | 1.5 |  |

TABLE 2-continued

|  |  | Layer A | Layer B | Layer C | Layer A | Layer B | Layer C | Layer A | Layer B | Layer C |
|---|---|---|---|---|---|---|---|---|---|---|
|  | Height H3 (m) |  | 1.38 |  |  | 1.38 |  |  | 1.38 |  |
|  | Height H1 (m) |  | 5 |  |  | 5 |  |  | 5 |  |
|  | Angle of repose (degree) b |  |  |  |  |  |  |  | 40 |  |
|  | Angle of repose (degree) a + b |  | 40 |  |  | 40 |  |  |  |  |
|  | Angle of repose (degree) a + c |  |  |  |  | 40 |  |  | 40 |  |
|  | Angle of repose (degree) b + e |  |  |  |  |  |  |  |  |  |
| Component ratio | DMT |  | 90 |  |  | 90 |  |  | 94 |  |
| mol % by mass | EG |  | 67.5 |  |  | 67.5 |  |  | 68.8 |  |
| (TiO$_2$:% by mass) Amorphous component | NPG |  | 22.5 |  |  | 0 |  |  | 14.4 |  |
|  | CHDM |  | 0 |  |  | 22.5 |  |  | 10.8 |  |
|  | TiO$_2$ |  | 10 |  |  | 10 |  |  | 6 |  |
|  | Temperature of melting |  | 280° C. |  |  | 280° C. |  |  | 280° C. |  |
|  | Thickness ratio | 20 | 60 | 20 | 20 | 60 | 20 | 20 | 60 | 20 |
| Extruding | Cooling condition | Roll-cooling 25° C. | Cold air at 10° C. Wind velocity (m/s) End: 10 Center: 8 |  | Roll-cooling 25° C. | Cold air at 10° C. Wind velocity (m/s) End: 10 Center: 8 |  | Roll-cooling 25° C. | Cold air at 10° C. Wind velocity (m/s) End: 10 Center: 8 |  |
|  | Take-up speed |  | 80 m/minute |  |  | 80 m/minute |  |  | 80 m/minute |  |
|  | Thickness of film |  | 200 μm |  |  | 200 μm |  |  | 200 μm |  |
| Transverse stretching | Heat exchanger |  | Nozzles arranged in a staggered manner |  |  | Nozzles arranged in a staggered manner |  |  | Nozzles arranged in a staggered manner |  |
|  | Preheating temperature |  | 90° C. |  |  | 90° C. |  |  | 90° C. |  |
|  | Stretching temperature |  | 80° C. |  |  | 80° C. |  |  | 80° C. |  |
|  | Stretch ratio |  | five times |  |  | five times |  |  | five times |  |
|  | Temperature difference in width direction after stretching |  | 0.8° C. |  |  | 0.6° C. |  |  | 0.5° C. |  |
| Heat setting | Temperature |  | 82° C. |  |  | 82° C. |  |  | 82° C. |  |
| Dimension | Thickness |  | 40 μm |  |  | 40 μm |  |  | 40 μm |  |
|  | Winding length |  | 4000 m |  |  | 4000 m |  |  | 4000 m |  |
|  | Length in the width direction |  | 4 m |  |  | 4 m |  |  | 4 m |  |

|  |  | Example 4 | | | Comparative Example 1 | | | Comparative Example 2 | | |
|---|---|---|---|---|---|---|---|---|---|---|
|  |  | Layer A | Layer B | Layer C | Layer A | Layer B | Layer C | Layer A | Layer B | Layer C |
| Mixing ratio of resin chips (% by mass) | Polyester (a) | 10 |  | 10 | 5 | 5 | 5 | 10 |  | 10 |
|  | Polyester (b) |  | 60 |  | 75 | 75 | 75 |  | 60 |  |
|  | Polyester (c) | 90 |  | 90 |  |  |  | 90 |  | 90 |
|  | Polyester (d) (containing TiO$_2$) |  | 20 |  | 20 | 20 | 20 |  | 20 |  |
|  | Raw material (e) (containing polystyrene) |  | 20 |  |  |  |  |  | 20 |  |
| Mixing condition | Inner pipe for polyester (d) | Unnec-essary | Use | Unnec-essary | Not use | Not use | Not use | Unnec-essary | Not use | Unnec-essary |
|  | Diameter (m) |  | 0.2 |  |  |  |  |  |  |  |
|  | Height H2 (m) |  | 1.5 |  |  |  |  |  |  |  |
|  | Height H3 (m) |  | 1.38 |  |  |  |  |  |  |  |
|  | Height H1 (m) |  | 5 |  | 5 | 5 | 5 |  | 5 |  |
|  | Angle of repose (degree) b |  |  |  |  |  |  |  |  |  |
|  | Angle of repose (degree) a + b |  |  |  | 40 | 40 | 40 |  |  |  |
|  | Angle of repose (degree) a + c |  |  |  |  |  |  |  |  |  |
|  | Angle of repose (degree) b + e |  | 38 |  |  |  |  |  | 38 |  |
| Component ratio mol % by mass (TiO$_2$:% by mass) Amorphous component | DMT |  | Amorphous component |  |  | 90 |  |  | Amorphous component |  |
|  | EG |  |  |  |  | 67.5 |  |  |  |  |
|  | NPG |  | 21.6 |  |  | 22.5 |  |  | 21.6 |  |
|  | CHDM |  | (mol % by mass) |  |  | 0 |  |  | (mol % by mass) |  |
|  | TiO$_2$ |  | 6 |  |  | 10 |  |  | 6 |  |
|  | Temperature of melting |  | 280° C. |  |  | 280° C. |  |  | 280° C. |  |
|  | Thickness ratio | 20 | 60 | 20 | 20 | 60 | 20 | 20 | 60 | 20 |

TABLE 2-continued

| Extruding | Cooling condition | Roll-cooling 25° C. | Cold air at 10° C. Wind velocity (m/s) End: 10 Center: 8 | Roll-cooling 25° C. | Cold air at 10° C. Wind velocity (m/s) End: 10 Center: 8 | Roll-cooling 25° C. | Cold air at 10° C. Wind velocity (m/s) End: 10 Center: 8 |
|---|---|---|---|---|---|---|---|
| | Take-up speed | 80 m/minute | | 80 m/minute | | 80 m/minute | |
| | Thickness of film | 200 μm | | 200 μm | | 200 μm | |
| Transverse stretching | Heat exchanger | Nozzles arranged in a staggered manner | | Nozzles arranged in a staggered manner | | Nozzles arranged in a staggered manner | |
| | Preheating temperature | 90° C. | | 90° C. | | 90° C. | |
| | Stretching temperature | 80° C. | | 80° C. | | 80° C. | |
| | Stretch ratio | five times | | five times | | five times | |
| | Temperature difference in width direction after stretching | 0.8° C. | | 0.9° C. | | 0.8° C. | |
| Heat setting | Temperature | 82° C. | | 82° C. | | 82° C. | |
| Dimension | Thickness | 45 μm | | 40 μm | | 45 μm | |
| | Winding length | 4000 m | | 4000 m | | 4000 m | |
| | Length in the width direction | 4 m | | 4 m | | 4 m | |

TABLE 3

| | | Examples | | | | Comparative Examples | |
|---|---|---|---|---|---|---|---|
| | | 1 | 2 | 3 | 4 | 1 | 2 |
| Hot-water shrinkage ratio in width direction at 98° C. | Measurement value (%) | 74 | 76 | 79 | 70 | 74 | 70 |
| | Difference in shrinkage ratio in width direction | 2 | 1 | 1 | 2 | 3 | 3 |
| | Difference in shrinkage ratio in longitudinal direction | 1 | 1 | 0.5 | 2 | 6 | 7 |
| Hot-water shrinkage ratio in longitudinal direction at 98° C. | Measurement value (%) | 2 | 2 | 1.5 | 1 | 2 | 1 |
| | Difference in shrinkage ratio in width direction | 0.5 | 0.5 | 1 | 0.5 | 1 | 1.5 |
| | Difference in shrinkage ratio in longitudinal direction | 0.5 | 0.5 | 1 | 1 | 3 | 3.5 |
| Apparent specific gravity | Measurement value (g/cm³) | 1.398 | 1.402 | 1.375 | 1.222 | 1.398 | 1.222 |
| | Difference in apparent specific gravity in width direction | 0.002 | 0.003 | 0.003 | 0.002 | 0.006 | 0.009 |
| | Difference in apparent specific gravity in longitudinal direction | 0.005 | 0.004 | 0.003 | 0.008 | 0.012 | 0.018 |
| Total light transmittance (%) | Measurement value (%) | 21 | 22 | 28 | 20 | 21 | 20 |
| | Difference in total light transmittance in width direction | 1 | 1 | 1 | 1 | 2 | 2 |
| | Difference in total light transmittance in longitudinal direction | 1 | 1 | 1 | 2 | 5 | 7 |
| Gloss (surface in contact with the cooling roll) | Measurement value (%) | 68 | 70 | 108 | 61 | 68 | 61 |
| | Difference in gloss in width direction | 2 | 2 | 1 | 1 | 4 | 6 |
| | Difference in gloss in longitudinal direction | 1 | 1 | 1 | 3 | 10 | 12 |
| Gloss (surface not in contact with the cooling roll) | Measurement value (%) | 68 | 70 | 107 | 61 | 68 | 61 |
| | Difference in gloss in width direction | 2 | 2 | 2 | 1 | 4 | 6 |
| | Difference in gloss in longitudinal direction | 1 | 1 | 1 | 3 | 9 | 12 |
| Heat shrinkage stress at 90° C. | Measurement value (MPa) | 8.8 | 8.3 | 7.2 | 6.5 | 8.8 | 6.5 |
| | Difference in heat shrinkage stress in width direction | 0.1 | 0.1 | 0.1 | 0 | 0.2 | 0.6 |
| | Difference in heat shrinkage stress in longitudinal direction | 0.1 | 0.1 | 0.1 | 0.1 | 0.8 | 1.4 |
| Solvent adhesive strength | Adhesive strength (N/15 mm) | 5.8 | 6 | 6.9 | 6.6 | 5.8 | 6.6 |
| Amorphous unit | Measurement value (mol % by mass) | 22.5 | 22.5 | 25.2 | 21.6 | 22.5 | 21.6 |
| | Difference in mol % in width direction | 0.1 | 0.1 | 0.1 | 0.1 | 0.5 | 0.5 |
| | Difference in mol % in longitudinal direction | 0.2 | 0.2 | 0.3 | 1.2 | 2.2 | 3 |
| | Shrinkage finish property | Good | Good | Good | Good | Good | Good |
| | Label height | Good | Good | Good | Good | Poor | Poor |

INDUSTRIAL APPLICABILITY

The white heat-shrinkable polyester-based film of the present invention has high quality and high practicality and has small difference in physical property in the width direction and the longitudinal direction of the film, so that it is suitable for industrial production. Therefore, stable shrinkage finish property can be obtained even when any position of the film is used, and it is particularly suitable for shrinkable labels.

EXPLANATION OF REFERENCE 1 hopper
2 extruder
3 inner pipe
4 outlet of inner pipe
10 extruded film
11a, 11b heat sources (heat exchangers)
12a, 12b hot air supply nozzles

The invention claimed is:

1. A roll of a white heat-shrinkable polyester-based film comprising at least one layer of a white polyester-based resin layer containing titanium oxide and satisfying the following requirements (1) to (6):
   (1) the length of the film is 1000 m or more and 20000 m or less and the width of the film is 400 mm or more and 10000 mm or less;
   (2) the heat-shrinkage percent change in a main shrinkage direction is 50% or more and 85% or less, wherein the heat-shrinkage percent change is measured according to a hot water treatment of a treatment temperature of 98° C. and a treatment time of 10 seconds;
   (3) the difference in percentage points between the maximum and minimum heat-shrinkage percent change in the main shrinkage direction among samples is 0 or more and 1.5 or less, wherein the heat-shrinkage percent change is measured according to the hot water treatment of a treatment temperature of 98° C. and a treatment time of 10 seconds and the samples are taken from each part of the film divided into five in the film width direction;
   (4) the difference in percentage points between the maximum and minimum heat-shrinkage percent change in the main shrinkage direction among samples is 0 or more and 1.5 or less, wherein the heat-shrinkage percent change is measured according to the hot water treatment of a treatment temperature of 98° C. and a treatment time of 10 seconds and the samples are taken from the film every 100 m in the film longitudinal direction from the place forming surface layer of the roll of the white heat-shrinkable polyester-based film to the starting place of winding the film;
   (5) the difference between the maximum and minimum apparent specific gravity among samples is 0 g/cm$^3$ or more and 0.01 g/cm$^3$ or less, wherein the samples are taken from each part of the film divided into five in the film width direction; and
   (6) the difference between the maximum and minimum apparent specific gravity among samples is 0 g/cm$^3$ or more and 0.010 g/cm$^3$ or less, wherein the samples are taken from the film every 100 m in the film longitudinal direction from the place forming surface layer of the roll of the white heat-shrinkable polyester-based film to the starting place of winding the film,
   wherein
   the white polyester-based resin layer comprises a polyester consisting essentially of (i) a terephthalic acid component, (ii) an ethylene glycol component, and (iii) a second polyol component consisting of
   neopentyl glycol, 1,4-cyclohexanedimethanol, or a combination thereof.

2. The roll of the white heat-shrinkable polyester-based film according to claim 1, wherein
   the total light transmittance of the film is 40% or less;
   the difference in percentage points between the maximum and minimum total light transmittance among samples is 3 or less, wherein the samples are taken from each part of the film divided into five in the film width direction; and
   the difference in percentage points between the maximum and minimum total light transmittance among samples is 3 or less, wherein the samples are taken from the film every 100 m in the film longitudinal direction from the place forming surface layer of the roll of the white heat-shrinkable polyester-based film to the starting place of winding the film.

3. The roll of the white heat-shrinkable polyester-based film according to claim 1, wherein
   the gloss of the film is 40% or more and 150% or less on both sides of the film, wherein the gloss is measured at 60 degrees angle;
   the difference in percentage points between the maximum and minimum gloss among samples is 5 or less on both sides of the film, wherein the samples are taken from each part of the film divided into five in the film width direction; and
   the difference in percentage points between the maximum and minimum gloss among samples is 5 or less on both sides of the film, wherein the samples are taken from the film every 100 m in the film longitudinal direction from the place forming surface layer of the roll of the white heat-shrinkable polyester-based film to the starting place of winding the film.

4. The roll of the white heat-shrinkable polyester-based film according to claim 1, wherein
   the heat shrinkage stress in the main shrinkage direction of the film is 9 MPa or less, wherein the heat shrinkage stress is measured according to a hot air treatment of a treatment temperature of 90° C.;
   the difference between the maximum and minimum heat shrinkage stress in the main shrinkage direction among samples is 1 MPa or less, wherein the heat shrinkage stress is measured according to the hot air treatment of a treatment temperature of 90° C. and the samples are taken from each part of the film divided into five in the film width direction; and
   the difference between the maximum and minimum heat shrinkage stress in the main shrinkage direction among samples is 1 MPa or less, wherein the heat shrinkage stress is measured according to the hot air treatment of a treatment temperature of 90° C. and the samples are taken from the film every 100 m in the film longitudinal direction from the place forming surface layer of the roll of the white heat-shrinkable polyester-based film to the starting place of winding the film.

5. The roll of the white heat-shrinkable polyester-based film according to claim 1, wherein the solvent adhesive strength of the film is 2 N/15 mm width or more and 10 N/15 mm width or less.

6. The roll of the white heat-shrinkable polyester-based film according to claim 1, wherein
the roll of the white heat-shrinkable polyester-based film has an amorphous unit derived from at least one selected from the group consisting of isophthalic acid, neopentyl glycol and cyclohexane dimethanol;
the difference between the maximum and minimum content of the amorphous unit among samples is 2 mol % by mass or less, wherein the samples are taken from each part of the film divided into five in the film width direction; and
the difference between the maximum and minimum content of the amorphous unit among samples is 2.0 mol % by mass or less, wherein the samples are taken from the film every 100 m in the film longitudinal direction from the place forming surface layer of the roll of the white heat-shrinkable polyester-based film to the starting place of winding the film.

7. A heat-shrinkable label obtained from the roll of the white heat-shrinkable polyester-based film according to claim 1.

8. A package comprising the heat-shrinkable label according to claim 7, wherein the heat-shrinkable label covers at least a part of a periphery of an object to be wrapped.

9. The roll of the white heat-shrinkable polyester-based film according to claim 1, wherein the white polyester-based resin layer is formed using a white polyester-based resin chip consisting essentially of titanium oxide and polyethylene terephthalate.

10. The roll of the white heat-shrinkable polyester-based film according to claim 1, wherein the white heat-shrinkable polyester-based film has the total light transmittance of 40% or less.

* * * * *